UNITED STATES PATENT OFFICE.

EDWARD H. WOODWARD, OF NEW YORK, N. Y.

IMPROVED PROCESS FOR EXTRACTING OIL FROM FISH.

Specification forming part of Letters Patent No. 57,427, dated August 21, 1866.

*To all whom it may concern:*

Be it known that I, EDWARD H. WOODWARD, of the city, county, and State of New York, have invented or discovered a new and useful Improvement in Extracting Oil from Fish; and I do hereby declare and ascertain my said invention, distinguishing it from all other processes now known in that manufacture, as follows:

Heretofore oil has been largely made from small fish or parts of fish by several complex processes, first boiling or steaming the fish in various apparatus, for which patents have been taken, and then submitting the boiled or cooked fish to a pressure, after which the expressed liquid is left to separate the oil from the other ingredients. These several processes involve much labor, time, and expense, and by none of them is the oil wholly extracted.

The purpose of my improved process is to extract the whole of the oil, and to do it in a much more simple manner at one operation without presses or other complex manipulations.

Instead of boiling or steaming the fish in the ways heretofore employed I place them in a large and strong digester, (an apparatus so well known as to need no description, as I do not claim any part thereof, with its pipes, safety-valve, &c.,) and having closed it tightly I submit the fish to a heat and pressure of several atmospheres, depending on the kind of fish operated on and other causes well known to the experienced manufacturer, and there treat the fish until all the constituent parts are thoroughly reduced and separated. I then draw off the contents from the digester into proper tanks, where the oil at once separates from the other parts and floats, and can be drawn off without further manipulation.

The other remaining material being thoroughly disintegrated needs no grinding or other labor expended upon it to fit it for the market, it being in a much better state therefor than the remainder of the fish of any other process heretofore employed for the purpose.

Having thus fully described my method of extracting oil from fish, I wish it to be understood that I do not claim any specific apparatus therefor in which it can be done; but

What I do claim, and desire to secure by Letters Patent, is—

Submitting fish to the action of a digester, as herein set forth, and extracting the oil therefrom without pressure, substantially as herein described.

E. H. WOODWARD.

Witnesses:
J. J. GREENOUGH,
STEPHEN G. CLARKE.